March 25, 1924.

C. MORTENSEN

MILK PASTEURIZER

Filed March 26, 1923

C. Mortensen, Inventor

By C. A. Snow & Co.

Attorneys

March 25, 1924.
C. MORTENSEN
1,487,796
MILK PASTEURIZER
Filed March 26, 1923  3 Sheets-Sheet 2
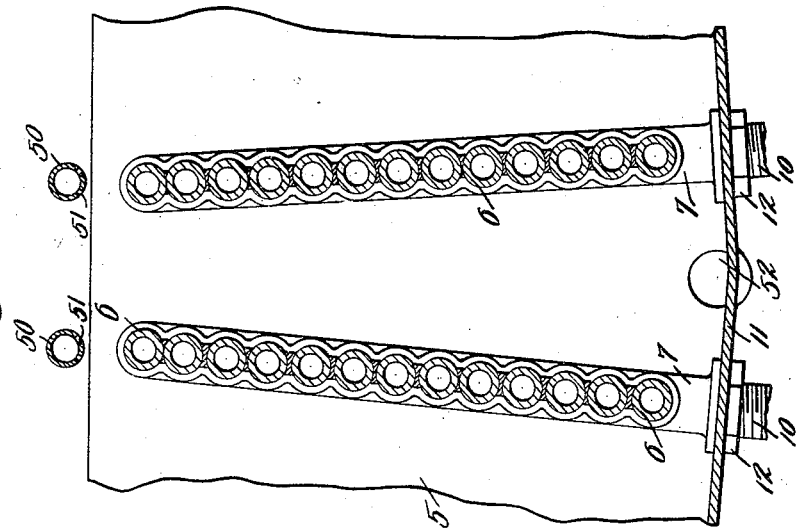
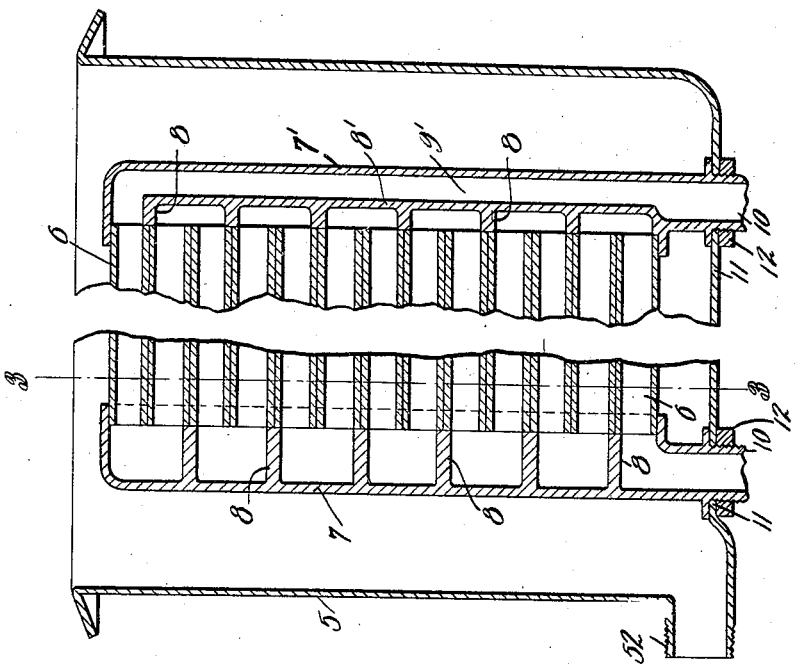
C. Mortensen, Inventor
Attorneys

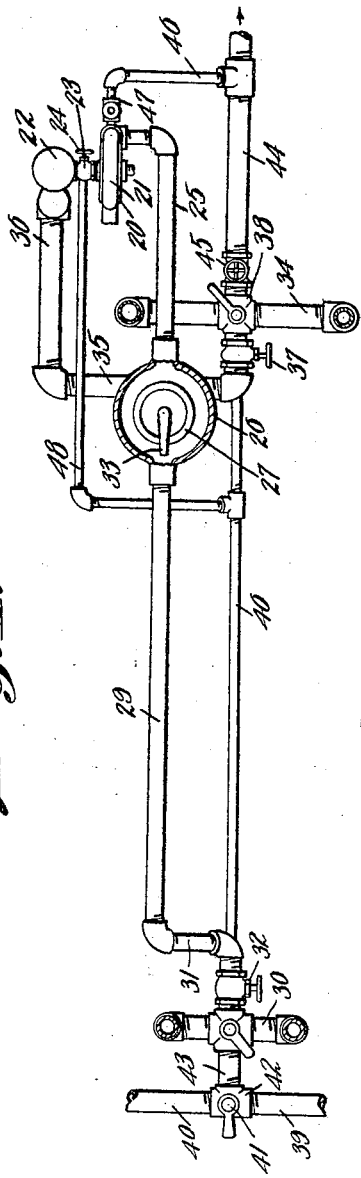

Patented Mar. 25, 1924.

1,487,796

UNITED STATES PATENT OFFICE.

CORNELIUS MORTENSEN, OF LOUISVILLE, KENTUCKY.

MILK PASTEURIZER.

Application filed March 26, 1923. Serial No. 627,834.

*To all whom it may concern:*

Be it known that I, CORNELIUS MORTENSEN, a citizen of the United States, residing at Louisville, in the county of Jefferson and State of Kentucky, have invented a new and useful Milk Pasteurizer, of which the following is a specification.

This invention relates to an apparatus especially designed for treating liquids, such as milk or the like, the primary object of the invention being to provide an apparatus which will accomplish the heating and cooling results with facility.

Another object of the invention is to provide means to insure the rapid heating or cooling of the liquid under treatment in order that the liquid will be carried rapidly over the churning temperature to insure against the coagulation of the butter fats in the liquid during the steps of the process.

A still further object of the invention is to provide a structure which will induce circulation of the fluid within the vat or tank, due consideration being given to the construction to eliminate churning of the fluid under treatment.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings:

Figure 2 is a broken longitudinal sectional view through the apparatus.

Figure 3 is a fragmentary sectional view taken on line 3—3 of Figure 2.

Figure 4 is a diagrammatical view of the system for directing the cooling or heating fluid to the apparatus.

Figure 5 is a plan view thereof.

Figure 1:
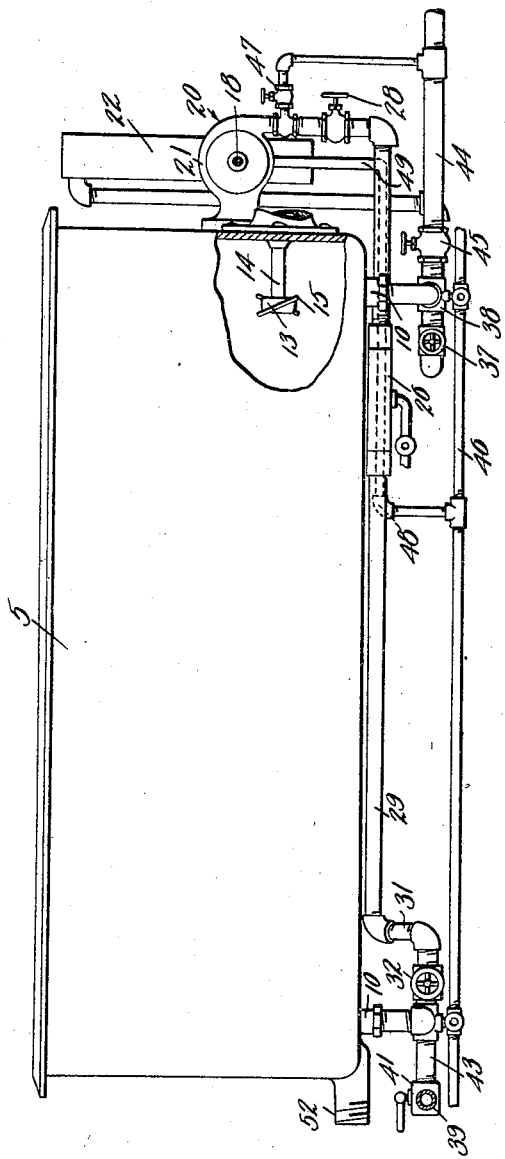
Figure 1 is a side elevational view of an apparatus constructed in accordance with the invention.

Referring to the drawings in detail, the apparatus embodies a vat or tank 5, which may be constructed of any desired material, and while I have shown the same as rectangular in formation, it is to be understood that the size and shape of the vat 5 may be varied to meet the requirements of usage.

The heating or cooling fluid passes through a plurality of superposed pipes 6 arranged in tiers within the vat 5, the ends of the pipes 6 being secured to the heads 7 and 7' respectively. These heads 7 and 7' are formed with partitions 8, the partitions 7 of one head being arranged in stepped relation with partitions of the opposed head, thereby causing the fluid to take an irregular course through the pipes. The heads 7' are formed with vertical partitioning walls 8' defining outlet passageways 9' communicating at their upper ends with the uppermost pipes of the tiers and at their lower ends with the extensions 10 associated therewith. As shown, these heads 7 are provided with extensions 10 that pass through suitable openings in the bottom wall 11 of the vat, the pipes resting on the flanges 11 and secured in position by means of the lock nuts 12 which are threaded on the extended ends of the pipes.

The tiers of pipes 6 are arranged at angles with respect to the side walls of the vat as clearly shown by Figure 5 of the drawings, providing a structure wherein the fluid under treatment may pass between the tiers of pipes and circulate through a contracted area at one end of the vat, where the fluid passes around the outer surfaces of the tiers of pipes and returned to repeat such circulation. It will further be seen that these tiers of pipes 6 are also tilted towards each other, providing a contracted area between the tiers of pipes at the upper ends thereof, to further increase the circulation of the fluid within the vat.

The agitating member is in the form of a propeller indicated at 13 mounted on the inner end of the shaft 14, the blades 15 thereof operating between the diverged ends of the tiers of pipes 6, so that the fluid in the vat will be forced between the tiers towards the converging ends thereof.

Mounted on the shaft 14 is a gear 16 that is in mesh with the worm 17 carried on the armature shaft 18 of the motor 19, whereby rotary movement of the shaft 18 is imparted to the shaft 14 and propeller supported thereby, through the worm 17 and gear 16. At the outer end of the shaft 18 is a pump 20 mounted in the pump housing 21, which pump is of the rotary type and communicates with the reservoir 22 through the pipe 23, there being provided a valve 24 in the pipe 23 to control the passage of fluid through the pump.

Communicating with the pump housing 21 is a feed pipe 25 that in turn communicates with the head 26 formed with a curved baffle 27 to break up the water passing into the head and cause the same to take circular paths within the head. A valve indicated at 28 controls the passage of water from the pump housing to the head 26.

29 designates a pipe which has connection with the head 26 at one end and connects with the horizontally disposed pipe 30 through the pipe 31 to supply water to the pipe 30 which in turn has connection with the heads 7, at one end of the vat. In order that the operator may control the passage of fluid through the pipe 30, the valve 32 is provided.

Steam, from a suitable source of supply, enters the head 26, through the nozzle 33 to accomplish the heating of the water passing through the system, the continuous passage of steam to the head maintains the water in a heated condition. It will thus be seen that as the heated water passes through the coils, it is returned to the reservoir 22, through the pipes 34, 35 and 36, valve members 37 and 38 being provided to control the passage of fluid at this point.

The cooling step of the process is accomplished by directing water from a service system through the pipe 39, or by passing brine into the system, through the pipe 40, a three-way valve 41 being provided in the valve housing 42 to control the passage of fluid to the pipe 30, which communicates with the pipe 30, through the pipe 43.

A drain pipe indicated at 44 communicates with the pipe 34, the passage of fluid through the pipe 44 being controlled by valve 45. Pipe 46 establishes communications between pipe 44 and the pump housing 21 so that when valve 47 is moved to establish communication between the pump housing 21 and pipe 44, fluid will be forced in the direction of the arrow, to drain the system.

Drain pipe 46 communicates with the pump housing 21 through pipes 48 and 49 so that the tiers of pipes and systems associated therewith may be thoroughly drained. Feed pipes are indicated at 50 and supply the milk or liquid to be treated to the vat 5 at a point directly above the pipes 6, openings 51 being provided in the pipes 50, so that the liquid will be sprayed over the pipes 6 to advance the cooling step.

In the operation of the apparatus, liquid to be treated is fed into the vat through the pipes 50 and sprayed over the tiers of pipes 6, valve 41 is now operated to cut off communication between pipes 39, 40 and 43, and the valve 32 is moved to its open position. The motor is started, resulting in the operation of the propeller 13 and pump 21, to the end that water is forced through the pipes 25, 29 and circulated through the tiers of pipes 6 from where the same is returned through pipes 34, 35 and 36, to the reservoir 22 it being understood that the valves 45 and 47 are closed during this operation, the valve 37 remaining open.

While water is being forced through the pipe 25 to the head 26, steam is also directed to the head 26 through the nozzle 33, to heat and retain the water in a heated condition until the fluid under treatment has reached a predetermined temperature, whereupon the heating medium is withdrawn from the system and the cooling immediately takes place.

The cooling step is accomplished by admitting water from the usual water supply system, through pipe 39, valve 41 having been turned to establish communication between pipes 39 and 42 and cut off communication between pipes 40 and 43. Valve 32 is also moved to a closed position so that as the water passes through pipes 39 and 43, the cooling water may enter the tiers of pipes 6 through pipe 30.

In the use of water as a cooling medium, the valves 37 and 38 are moved to establish communication between pipes 34 and 44, allowing the water to pass from the system through pipes 6.

If it is desired to use brine as a cooling medium, the valve 41 is moved to establish communication between pipes 40 and 43 and cut off communication between pipes 39 and 43, admitting brine to the system through the pipe 40, from a suitable source of supply.

It is to be understood that while the heating or cooling medium is passing through the pipes of the system, the propellor is rapidly rotated, causing the fluid to circulate between the tiers of pipes 6 and between the pipes and side walls of the tank.

When the liquid has been properly treated, the same may be drawn off through the drain pipe 52 located at the bottom of the vat 5.

Having thus described the invention, what is claimed as new is:—

A liquid treating apparatus including a fluid containing vat, tiers of communicating horizontally disposed pipes arranged within the vat, the tiers of pipes being arranged at angles with respect to the side walls of the vat, means for directing liquid to be treated to the tank, means for agitating the fluid within the vat, and forcing the liquid between the tiers of pipes, and means for directing a cooling medium through the pipes.

In testimony that I claim the foregoing as my own, I have hereto affixed my signature in the presence of two witnesses.

CORNELIUS MORTENSEN.

Witnesses:
 I. E. SIMPSON,
 P. A. ROCKELLI.